United States Patent
Ablabutyan et al.

(10) Patent No.: US 9,852,862 B2
(45) Date of Patent: Dec. 26, 2017

(54) SOLENOID OPERATED CIRCUIT

(75) Inventors: Karapet Ablabutyan, Glendale, CA (US); George Y. Marji, La Mirada, CA (US)

(73) Assignee: MAXON INDUSTRIES, INC., Santa Fe Springs, CA (US)

(*) Notice: Subject to any disclaimer, the term of this patent is extended or adjusted under 35 U.S.C. 154(b) by 690 days.

(21) Appl. No.: 14/237,242

(22) PCT Filed: Aug. 3, 2012

(86) PCT No.: PCT/US2012/049534
§ 371 (c)(1),
(2), (4) Date: Feb. 5, 2014

(87) PCT Pub. No.: WO2013/022755
PCT Pub. Date: Feb. 14, 2013

(65) Prior Publication Data
US 2014/0169919 A1 Jun. 19, 2014

Related U.S. Application Data

(60) Provisional application No. 61/515,496, filed on Aug. 5, 2011.

(51) Int. Cl.
*H01H 47/22* (2006.01)
*H02H 7/22* (2006.01)
*B60P 1/44* (2006.01)
(52) U.S. Cl.
CPC .......... *H01H 47/22* (2013.01); *B60P 1/4478* (2013.01); *H02H 7/222* (2013.01)

(58) Field of Classification Search
CPC .............................. H01H 47/22; B60P 1/4478
See application file for complete search history.

(56) References Cited

U.S. PATENT DOCUMENTS

| | | | | |
|---|---|---|---|---|
| 4,776,514 A | * | 10/1988 | Johnstone | G05D 23/24 165/253 |
| 5,816,977 A | * | 10/1998 | Yasue | F16H 61/061 251/129.08 |
| 7,336,470 B2 | * | 2/2008 | Satoh | H01F 7/18 361/152 |
| 7,385,701 B2 | | 6/2008 | Watanabe et al. | |
| 7,385,791 B2 | * | 6/2008 | Ness | H01H 50/541 361/8 |

(Continued)

OTHER PUBLICATIONS

International Preliminary Report on Patentability dated Feb. 20, 2014 for International Application No. PCT/US2012/049534 from the International Bureau of WIPO, pp. 1-10, Geneva, Switzerland.

(Continued)

*Primary Examiner* — Thienvu Tran
*Assistant Examiner* — Tien Mai
(74) *Attorney, Agent, or Firm* — Brooks Acordia IP Law, PC; Michael Zarrabian (57) ABSTRACT

A solenoid operated circuit comprises a solenoid switch having a solenoid coil for moving one or more electrical contacts from a first position to a second position to switch an electrical motor ON/OFF, and a solenoid controller that includes an arc suppression circuit that mitigates a reverse self-induced voltage from the electrical motor thereby suppressing electrical arcing on switch contacts.

21 Claims, 11 Drawing Sheets

(56) References Cited

U.S. PATENT DOCUMENTS 7,429,804 B2 * 9/2008 Lengacher ............ B60P 1/4471
　　　　　　　　　　　　　　　　　　　307/9.1
7,821,753 B2 * 10/2010 Evans .................... H02H 9/001
　　　　　　　　　　　　　　　　　　　361/90

OTHER PUBLICATIONS

Office action for Mexican Patent Application No. MX/a/2014/001302, dated Feb. 4, 2015.
International Search Report & Written Opinion dated Oct. 26, 2012 for International Application No. PCT/US2012/049534 from the International Bureau of WIPO, pp. 1-18, Geneva, Switzerland.

* cited by examiner

SOLENOID OPERATED CIRCUIT

CROSS REFERENCE TO RELATED APPLICATION

This application is the U.S. National Phase Patent Application under 35 U.S.C. §371 of International Application Number PCT/US2012/049534, filed on Aug. 3, 2012, which claims priority to U.S. Provisional Patent Application Ser. No. 61/515,496 filed Aug. 5, 2011. Both applications, International Application Number PCT/US2012/049534 and U.S. Provisional Patent Application Ser. No. 61/515,496, are incorporated herein by reference in their entirety.

FIELD OF THE INVENTION

The present invention relates generally to electrical power control and in particular to controlling electrical solenoids for electrical motors.

DESCRIPTION OF RELATED ART

Lift gates are typically mounted at a structure such as the rear of a vehicle to lift payloads on a platform from one level (e.g., ground level) up to another level (e.g., the bed of the vehicle), or vice versa. Solenoids such as electrical motor starter solenoids are used in lift gate pump electrical motor actuators. Electrical arcing (sparking) occurs when a current flowing through a lift gate pump motor coil is interrupted. The interruption occurs when the lift operation is stopped by the operator, wherein a reverse self-induced voltage is generated from the pump motor coil in the starter solenoid contacts that causes metal to transfer from one electrical contact to another.

As metal erodes on each solenoid contact opening, the resistance through the contacts increases, leading to temperature increase on contacts. Contact resistance and temperature increase lead to melting and ultimately welding together of the contacts, wherein the solenoid contacts remain in the closed position and in the ON state.

BRIEF SUMMARY OF THE INVENTION

In one embodiment, the present invention provides a solenoid operated circuit comprising a solenoid switch having a starter solenoid coil for moving one or more electrical contacts from a first open position to a second closed position to switch an electrical motor ON/OFF, and a solenoid controller that includes a suppression circuit that mitigates a reverse self-induced voltage from the electrical motor coil, thereby suppressing electrical arcing between starter solenoid contacts.

In one embodiment, the solenoid controller further comprises a power assist circuit that regulates electrical power to the starter solenoid coil to maintain the starter solenoid coil voltage above a dropout voltage of the starter solenoid coil.

In one embodiment, the solenoid controller further comprises a time delay circuit that maintains an ON Delay state of the starter solenoid coil for a time period to allow electrical power to energize hydraulic valves solenoids first and while the electrical motor coil is being energized through starter solenoid contacts.

These and other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one embodiment the present invention provides a controller for a solenoid circuit including a solenoid switch. In one example, a solenoid switch comprises a starter solenoid including an electrical conductive coil of wire wound around a ferromagnetic core such as a solid iron core. A solenoid valve is an integrated device comprising a solenoid which actuates either a pneumatic or hydraulic valve, or a solenoid switch, which employs an electromechanical solenoid to operate an electrical switch.

When electrical current is applied to the starter solenoid coil, a resulting magnetic field is focused by the solenoid core, thereby providing an electromagnet function. Solenoids are used in switches to turn ON/OFF high current devices based on such electromagnet function, such as magnetically attracting (engaging) one or more contacts for closing an electrical circuit (such as in a pump motor coil) when the solenoid coil is energized. As noted, electrical arcing occurs between starter solenoid switch contacts when a current flowing through the pump motor coil is interrupted.

According to an embodiment of the present invention, in one aspect a controller for a solenoid circuit reduces (or suppresses) electrical arcing on an electrical contact when the current flowing through the pump motor coil is interrupted. The controller mitigates generation of a reverse self-induced voltage from the pump motor coil that causes electrical arcing between starter solenoid switch contacts. In another aspect the controller regulates power to starter solenoid coil. In another aspect the controller provides priority power to hydraulic solenoid valves.

Figure 1:
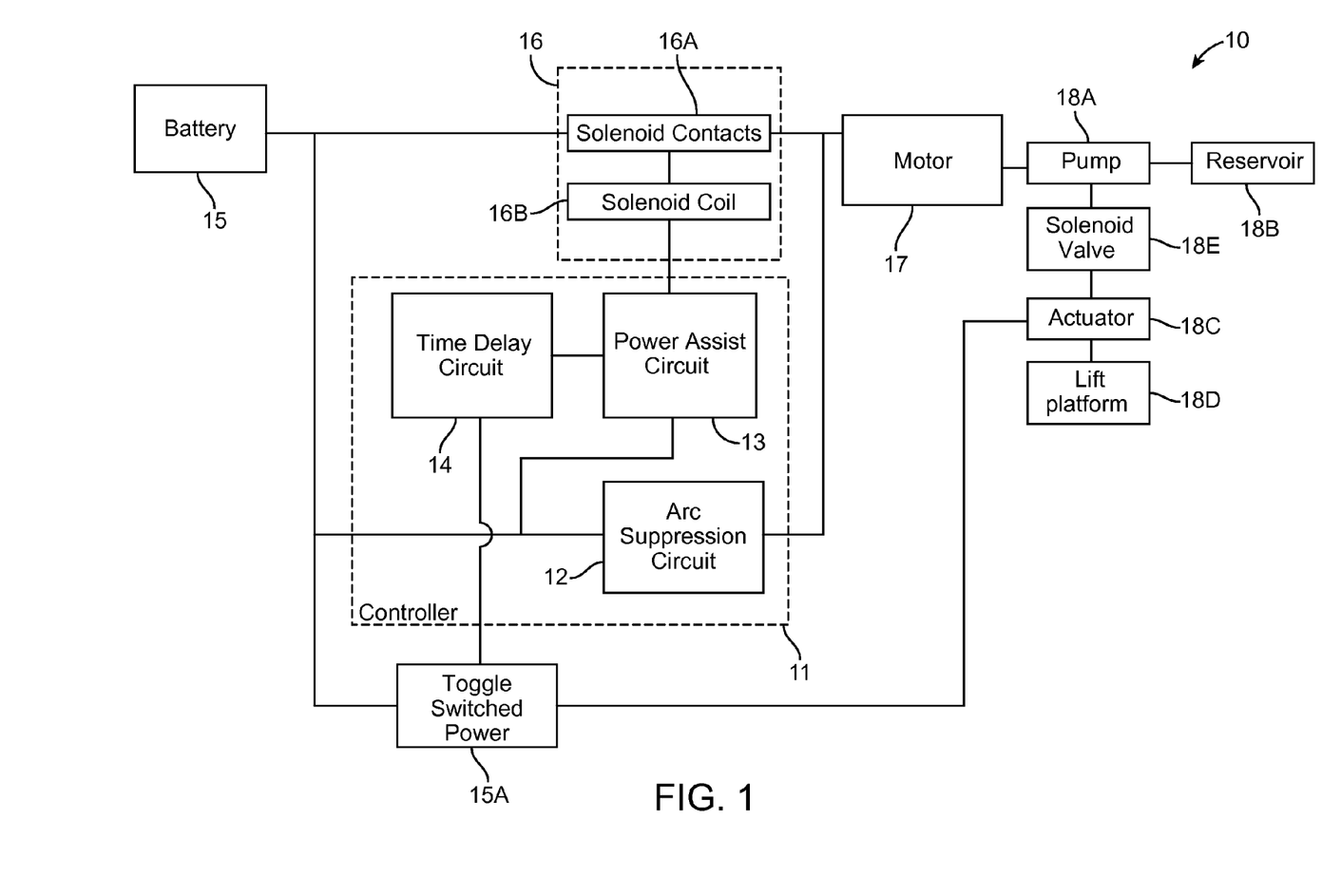
FIG. 1 shows a block diagram of an electrical pump motor circuit architecture including a solenoid controller, according to an embodiment of the invention.

FIG. 1 shows a block diagram of an electrical pump motor circuit architecture 10 including a controller 11, according to an embodiment of the invention. FIG. 1 illustrates an application of a starter solenoid switch 16 in a lift gate wherein a battery 15 powers pump motor 17 for a lift gate actuator 18C via a starter solenoid switch device 16. The starter solenoid switch 16 operates similar to a relay, and comprises starter solenoid contacts 16A and starter solenoid coil 16B. In one example, the pump motor 17 comprises a direct current (DC) electrical motor that includes an electrical motor coil 17A, wherein the electrical motor spins a hydraulic pump 18A for pumping hydraulic fluid from a reservoir 18B to/from a hydraulic solenoid valve 18E (FIG. 2) and an actuator 18C for raising/lowering the lift gate platform 18D.

In one embodiment the controller 11 includes an electrical arc suppression circuit 12, a power assist circuit 13 and a time delay circuit 14. The arc suppression circuit 12 reduces (or suppresses) electrical arcing when the current flowing through the pump motor coil 17A (FIG. 2) is interrupted. The power assist circuit 13 regulates power to the starter solenoid switch coil 16B for moving the starter solenoid contacts 16A to turn ON/OFF electrical power to the pump motor 17. The time delay circuit 14 provides priority power to hydraulic solenoid switch valves 18E.

Figure 2:
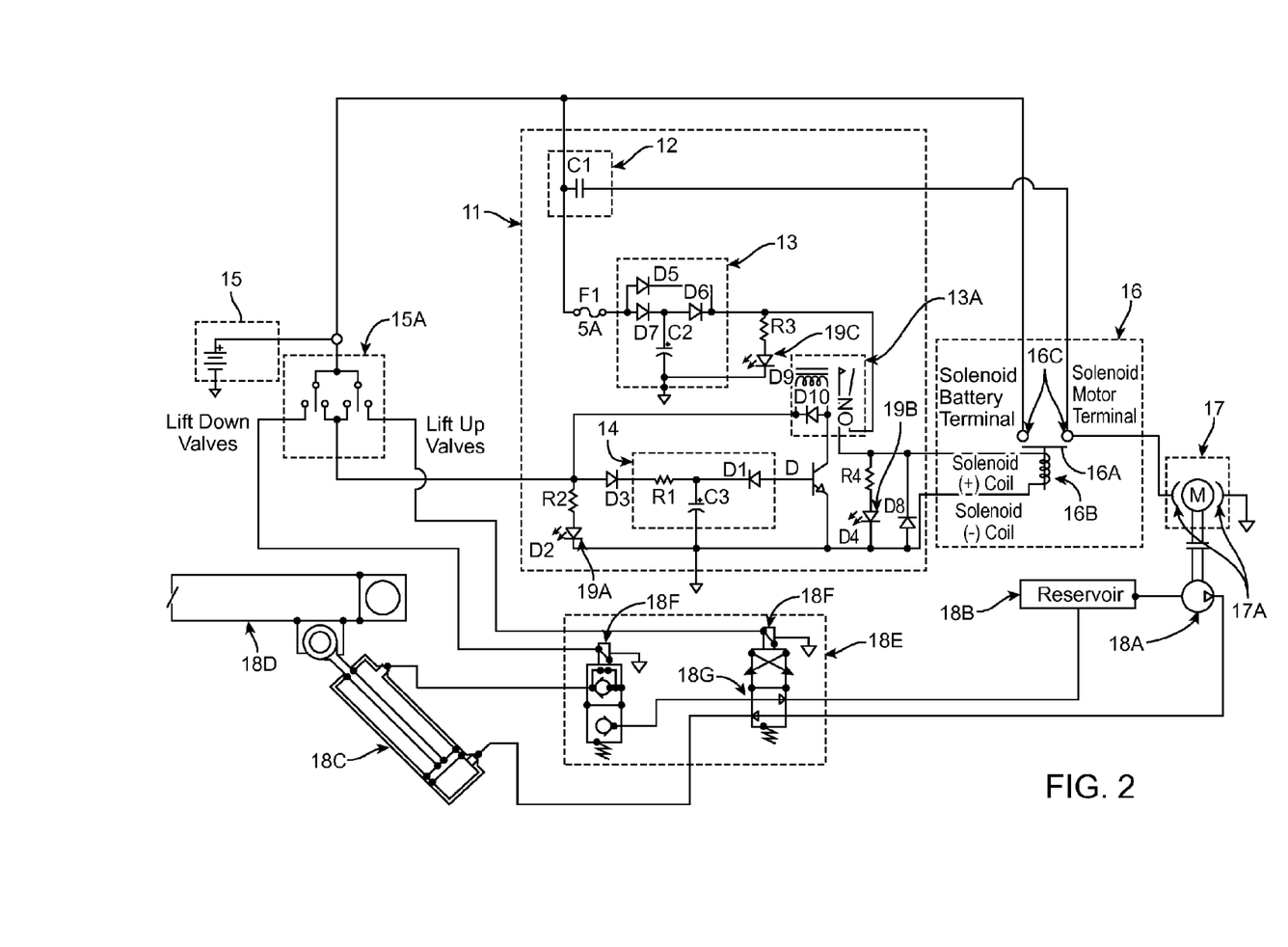
FIG. 2 shows a schematic diagram of an implementation of the solenoid controller in the architecture of FIG. 1, according to an embodiment of the invention.

FIG. 2 is a schematic circuit diagram of an implementation of the architecture 10, illustrating an embodiment of the controller 11, according to an embodiment of the present invention.

In one embodiment, the arc suppression circuit 12 of the controller 11 functions as a filter circuit at the instant of voltage reversal in the starter solenoid contacts 16A due to interruption of the current flowing through the pump motor coil 17A.

The arc suppression circuit 12 absorbs the electrical energy due to said reversed voltage at the starter solenoid contacts 16A, and transfers that energy (voltage) back to the pump motor coil 17A and the battery 15. Since generally the electrical resistance of the pump motor coil 17A resistance is very low, that energy is dissipated quickly. This reduces (prevents) electrical arcing of the starter solenoid contacts 16A due to such reversed voltage from the pump motor coil 17A, according to an embodiment of the invention.

In the implementation shown in FIG. 2, the arc suppression circuit 12 comprises a passive electrical element such as a capacitor C1 (e.g., about 2200 µF, 35V). The capacitor C1 connected in parallel between the starter solenoid switch terminals 16C and in series to the electrical pump motor 17. Specifically, the capacitor C1 is connected in parallel with the starter solenoid contacts 16A and terminals 16C (i.e., a solenoid battery power terminal and starter solenoid motor terminal). The capacitor C1 functions as a filter circuit at the instant of voltage reversal in the starter solenoid contacts 16A when the current flowing through the pump motor coil 17A is interrupted.

The energy due to said reversed voltage of the starter solenoid contacts 16A is absorbed by the capacitor C1. The capacitor C1 then transfers that energy (voltage) back to the electrical pump motor coil 17A and battery 15, which is dissipated quickly in the pump motor coil 17A. In another embodiment, the arc suppression circuit 12 may comprise an active electrical element to absorb and dissipate the reversed voltage from the motor coil 17A of the pump motor 17.

Without a regulated power source as in a conventional solenoid switch circuits in hydraulic lift gate systems, the starter solenoid coil voltage can drop to or below a dropout voltage. In one example, a dropout voltage refers to the power level at which the internal forces in a starter solenoid spring return overcome the solenoid coil magnetic field and can no longer maintain a latched condition (the dropout voltage is the starter solenoid coil voltage which is to de-energize and break the circuit).

This is considered as a critical operating state of the solenoid with respect to the magnetic field of the coil. As the solenoid magnetic field becomes weaker, the contact pulling force becomes less firm. Thus, contact resistance and temperature increases.

Figure 3:
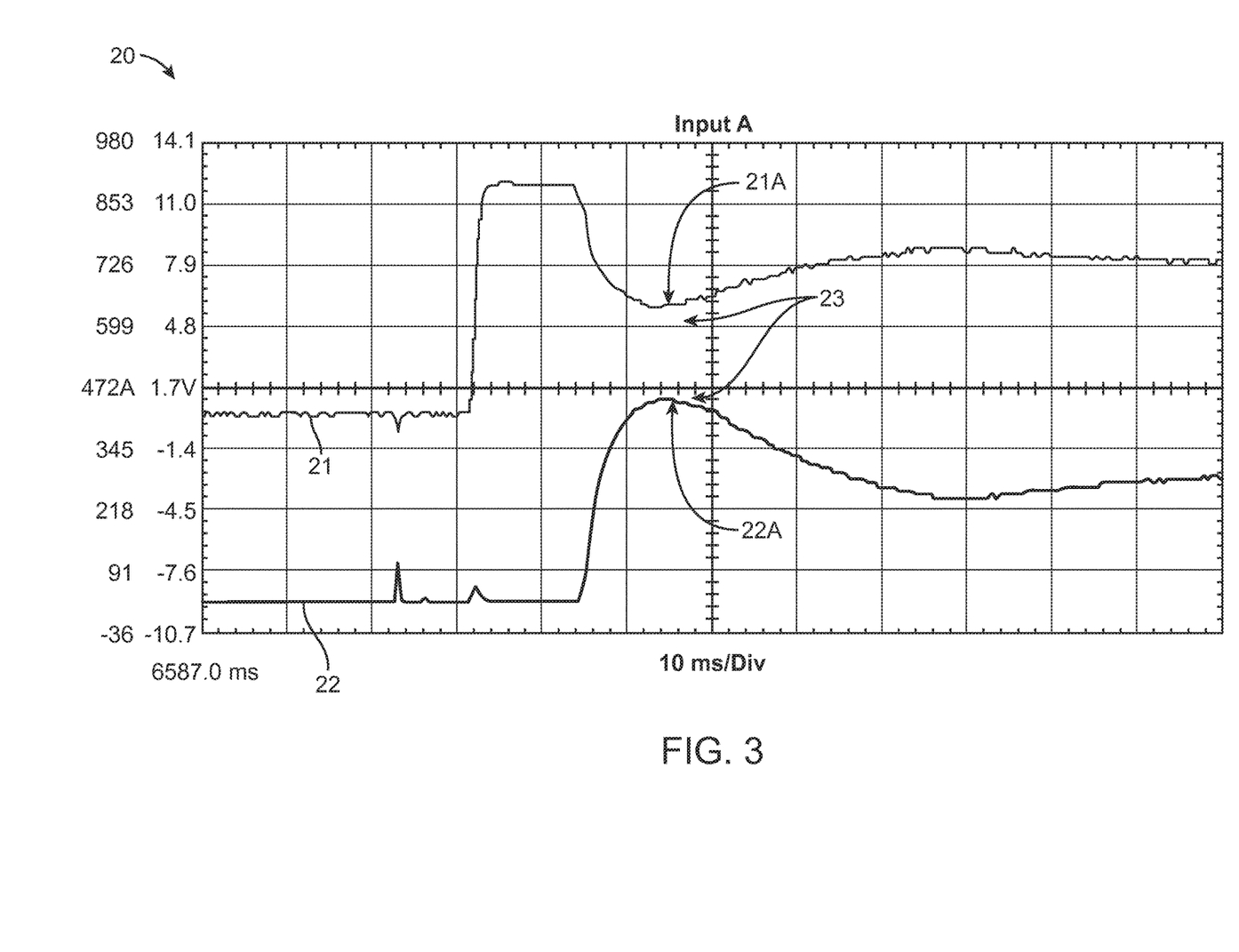
FIG. 3 shows an example solenoid coil voltage waveform and pump motor current waveform in the electrical pump motor circuit architecture, without a solenoid controller of the invention.

FIG. 3 shows a diagram 20 that illustrates graphical data demonstrating an example starter solenoid coil 16B voltage waveform 21 and corresponding pump motor coil 17A current waveform 22. In the example shown in FIG. 3, the horizontal axis represents time in milliseconds (e.g., 10 ms per division), and the vertical axis represents two data columns, to the right corresponding to starter solenoid coil 16B voltage waveform, and to the left corresponding to the pump motor coil 17A current waveform.

FIG. 3 further illustrates a profile of starter solenoid coil 16B voltage drop 21A (e.g., voltage drop to starter solenoid coil 16B 5.8 Volts, causing a weak magnetic field pull force to starter solenoid contacts 16A and terminals 16C) and corresponding profile of pump motor 17 current waveform 22A (e.g., pump motor coil 17A startup current 424 Amperes).

FIG. 3 further illustrates critical operating state areas 23 of starter solenoid contacts 16A and terminals 16C (causing damaging chattering on the solenoid contacts). Arcing and voltage drop on the starter solenoid coil 16B, leads to solenoid contacts problems.

In one embodiment of the invention, the power assist circuit 13 of the controller 11 regulates electrical power to the starter solenoid switch coil 16B to maintain the starter solenoid coil voltage at a desired level (e.g., above said dropout voltage). In the implementation of controller 11 shown in FIG. 2, the power assist circuit 13 comprises a capacitor C2 and three diodes D5, D6 and D7, interconnected as shown. In one implementation, the capacitor C2 is of large charge capacity (e.g., about 5000 uF or more) to assist in maintaining the starter solenoid coil voltage above a dropout voltage. The interconnected diodes D5 and D7 block a voltage drop caused by the motor coil 17A of the pump motor 17.

Figure 4:
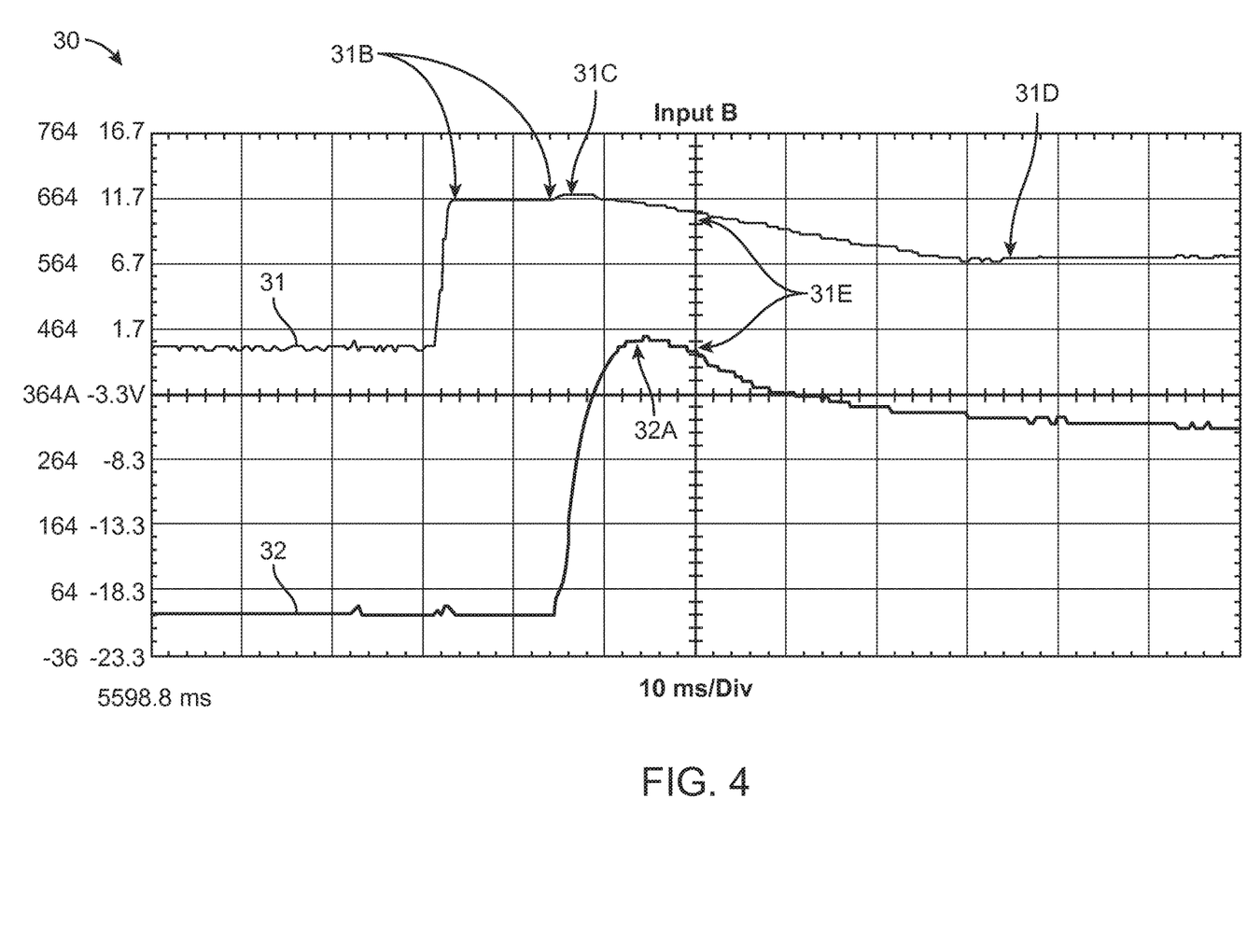
FIG. 4 shows an example solenoid coil voltage waveform and pump motor current waveform in the electrical pump motor circuit architecture of FIG. 2 with a solenoid controller, according to an embodiment of the invention.

In comparison to FIG. 3, FIG. 4 shows a diagram 30 including graphs of example solenoid voltage 31 and example pump motor coil 17A voltage profile 32 under control of the controller 11 with power assist from the power assist circuit 13 (e.g., based on supply voltage from C2 as a 10000 uF capacitor), according to an embodiment of the invention. With such power assist, the magnetic field of the starter solenoid coil 16B can maintain a proper and firm contact pull (push) force to maintain starter solenoid contacts 16A against terminals 16C.

As shown in FIG. 2, the controller 11 is connected to electrical power (e.g., battery 15) and draws current therefrom as needed (e.g., about 10 mA draw).

Figure 2A:
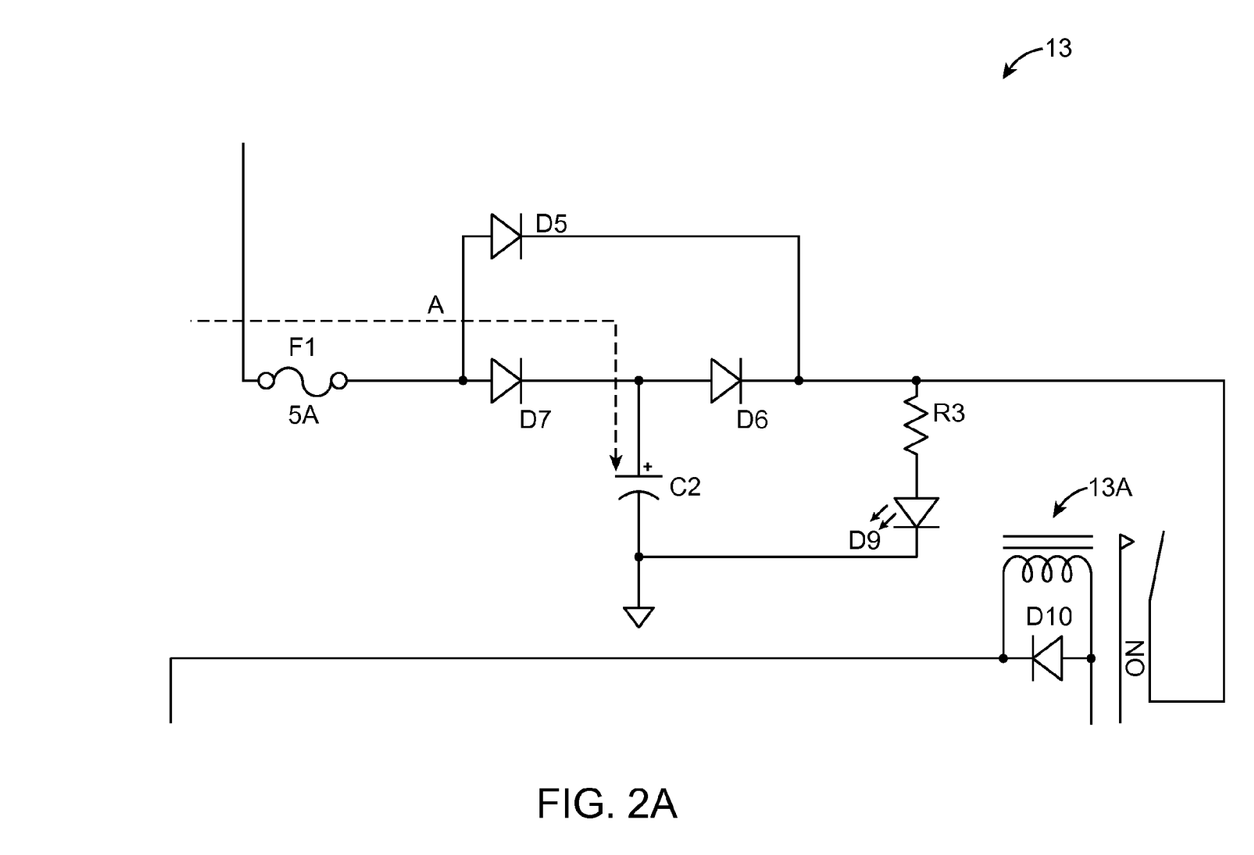
FIG. 2A shows a schematic diagram of an implementation of a power assist circuit of the solenoid controller of FIG. 2, illustrating a first operational mode of the power assist circuit wherein a first electrical path supplies electrical power to the power assist circuit to store electrical charge in a charge storage therein, according to an embodiment of the invention.

FIG. 2A shows an enlarged view of the power assist circuit 13, illustrating a first operational mode of the power assist circuit 13 wherein an electrical path supplies electrical power to the power assist circuit. In FIG. 2A the arrow A illustrates said electrical path through which the diode D7 supplies voltage to the capacitor C2 from the battery 15, wherein the capacitor C2 stores electrical charge therein.

Figure 2B:
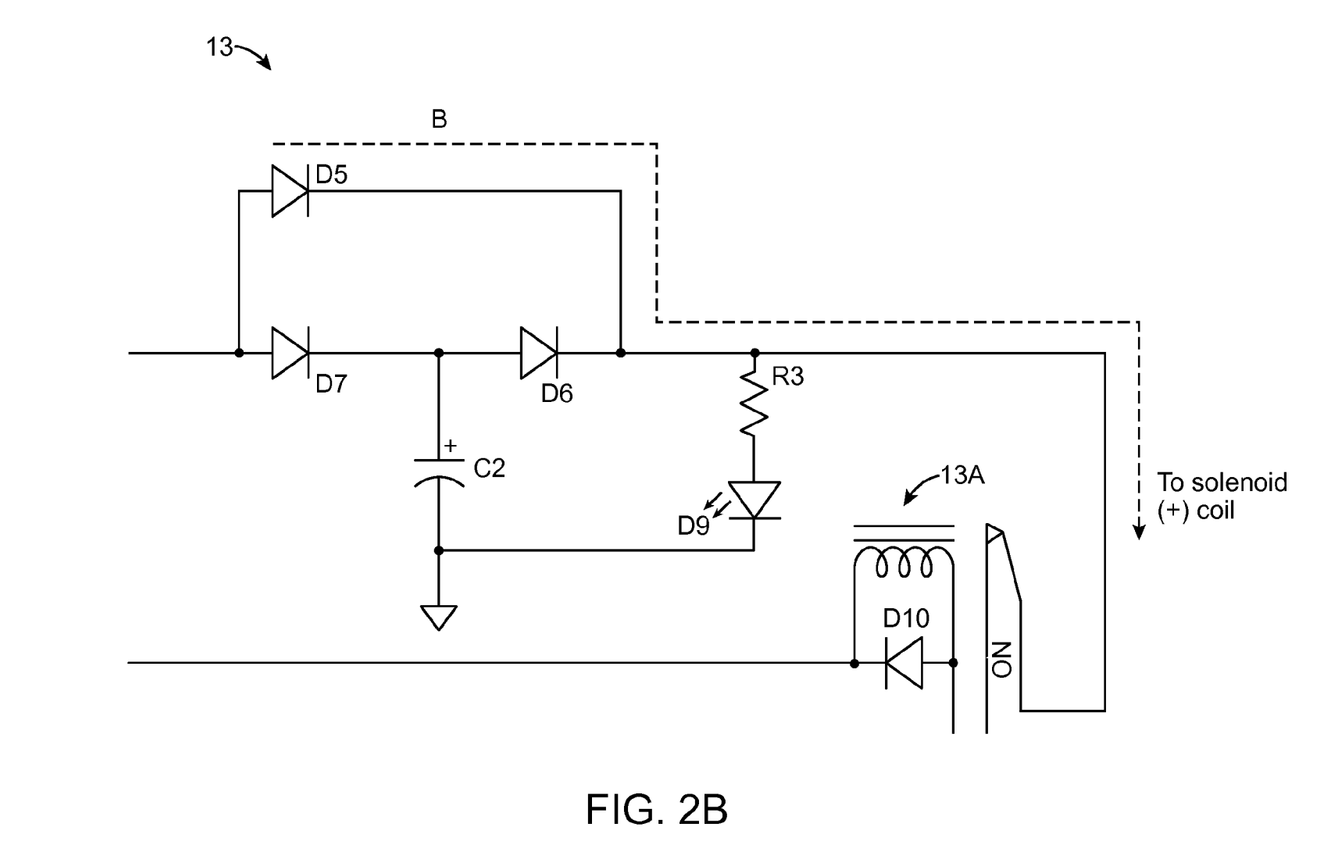
FIG. 2B illustrates a second operational mode of the power assist circuit, wherein a second electrical path supplies electrical power from a battery to the solenoid coil to energize the solenoid coil, according to an embodiment of the invention.

FIG. 2B illustrates a second operational mode of the power assist circuit 13, wherein a second electrical path supplies electrical power from a battery 15 through relay 13A to energize the starter solenoid coil 16B, to maintain the voltage of the solenoid coil 16B above said dropout voltage.

As shown in FIG. 2, in one embodiment, the lift gate includes its own toggle switch 15A (FIG. 1) which is used to supply electrical power to the starter solenoid coil 16B for switching the pump motor 17, and solenoid coils of other hydraulics valves for switching and operating the lift gate.

In one example, upon running the lift gate via its own toggle switch 15A, when voltage across diode D5 is higher than the voltage across the diode D6, the starter solenoid coil 16B is energized from the battery 15 via the second electrical path through the diode D5 (as shown by arrow B). The starter solenoid coil 16B is energized in this manner for a time period (e.g., about 12 mS) as indicated in FIG. 4 by the plateau region 31B of the solenoid coil voltage to maintain the voltage of the starter solenoid coil 16B above said dropout voltage.

Figure 2C:
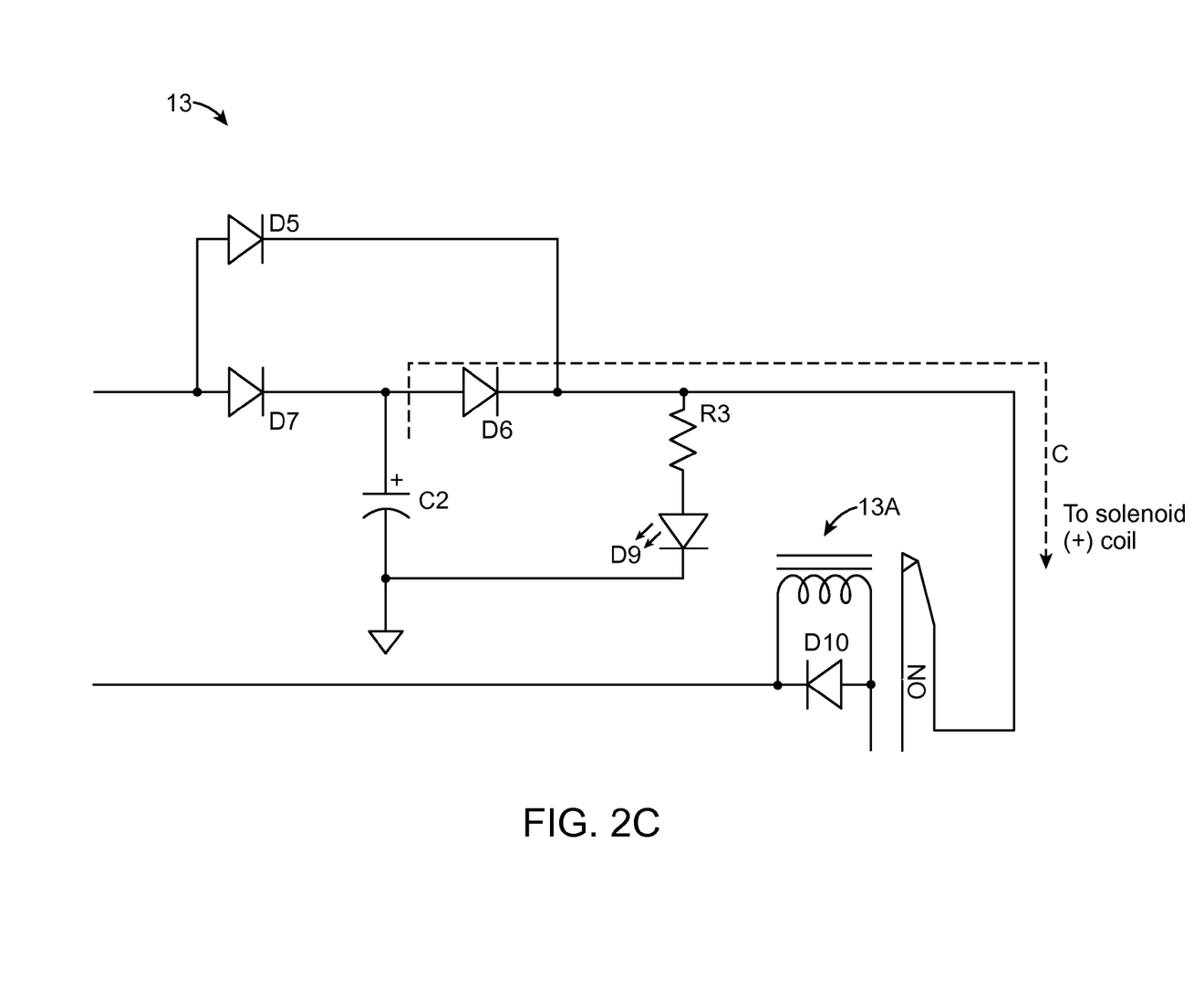
FIG. 2C illustrates a third operational mode of the power assist circuit, wherein a third electrical path supplies electrical power from a charge storage in the power assist circuit to the solenoid to energize the solenoid coil, according to an embodiment of the invention.

FIG. 2C illustrates a third operational mode of the power assist circuit 13, wherein a third electrical path supplies electrical power from a charge storage in the power assist circuit 13 to the starter solenoid 16 to energize the starter solenoid coil 16B to maintain the voltage of the starter solenoid coil 16B above said dropout voltage, according to an embodiment of the invention.

As shown in FIG. 2C, as voltage across the diode D5 drops below the voltage across the diode D6, capacitor C2 supplies voltage to the starter solenoid coil 16B via the diode D6 (as shown by arrow C in FIG. 2C), preventing a large voltage drop that may otherwise occur as shown in waveform in FIG. 3.

In FIG. 4, region 31C of the voltage of the starter solenoid coil 16B indicates diode D6 supplying power to the starter solenoid 16 when voltage from diode D5 drops. Region 31D indicates voltage drop to a first level (e.g., about 7V) beyond the critical operating state area. Regions 31E of the voltage of the starter solenoid coil 16B and voltage of the pump motor 17 show capacitor supply of a sustained voltage above a second level (e.g., about 12V) during the critical timing of starter solenoid 16B operation. Region 32A of the pump motor 17 voltage shows pump motor 17 startup current (e.g., about 444 Amps).

In one example, at initial startup, pump motor 17 current can peek above a threshold (e.g., 440 Amps within 6 milliseconds), wherein the magnetic field of the starter solenoid coil 16B is weakened by low voltage supply as shown in FIG. 3. At this time mechanical urging of the solenoid internal starter contacts 16A to the terminals 16C due to magnetic field of the starter solenoid coil 16B becomes less firm when closed.

The importance of firmness (strength) of mechanical urging of the solenoid internal starter contacts 16A to the starter terminals 16C when closed is that providing adequate electrical contact surface area between the starter contacts 16C and the starter terminals 16A allows proper amount of electrical current (e.g., high amperage) to safely pass through between the starter terminals 16C and the contacts 16A without compromising firmness between the contacts 16A and terminals 16C. With less electrical contact surface area between the terminals 16C and the contacts 16A, such high amperage causes substantial damage to contacts 16A and terminals 16C. The high amperage and low voltage to solenoid contacts 16A surface area and coil 16B, respectively, is important in timing of the solenoid 16B startup operation.

Figure 2D:
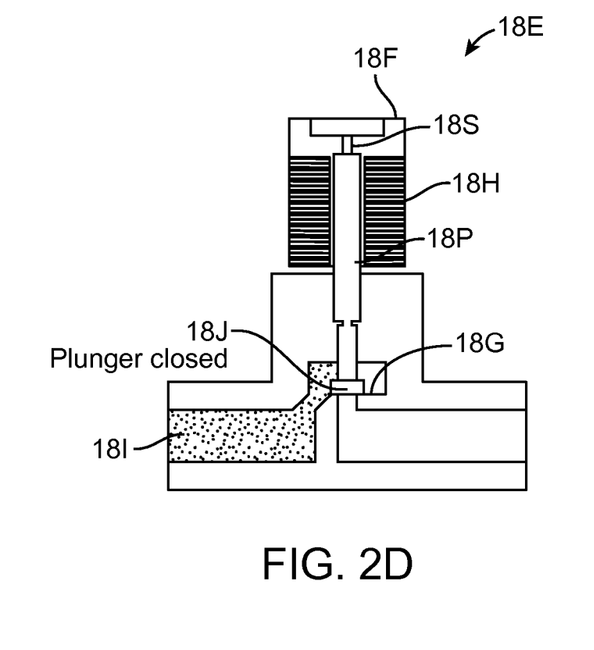
FIG. 2D illustrates a schematic of a hydraulic solenoid valve, in a de-energized closed valve state.
Figure 2E:
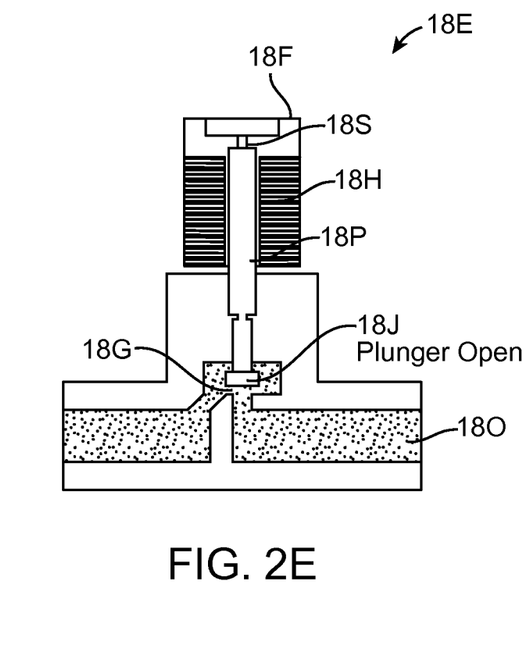
FIG. 2E illustrates a schematic of a hydraulic solenoid valve in an energized open valve state.

FIG. 2D illustrates a schematic of a hydraulic solenoid valve 18E and its solenoid 18F, in a de-energized closed valve state, and FIG. 2E illustrates the hydraulic solenoid valve 18E in an energized open valve state (without application of the controller 11). The solenoid 18F moves a plunger 18J between open and closed positions. The plunger 18J is connected to the solenoid core 18P, which is spring loaded to a closed position via the spring 18S when the hydraulic solenoid valve 18E is de-energized.

In the de-energized closed valve state of the hydraulic solenoid valve 18E (FIG. 2D), the plunger 18J is closed to block flow of hydraulic fluid from a hydraulic fluid inlet valve 18I to a hydraulic fluid outlet valve 18O (FIG. 2E). In the energized open valve state (FIG. 2E), the energized solenoid 18F exerts pulling force on the plunger 18J to compress the spring 18S and open the plunger 18J to allow flow of hydraulic fluid between an inlet valve and an outlet valve.

Figure 2F:
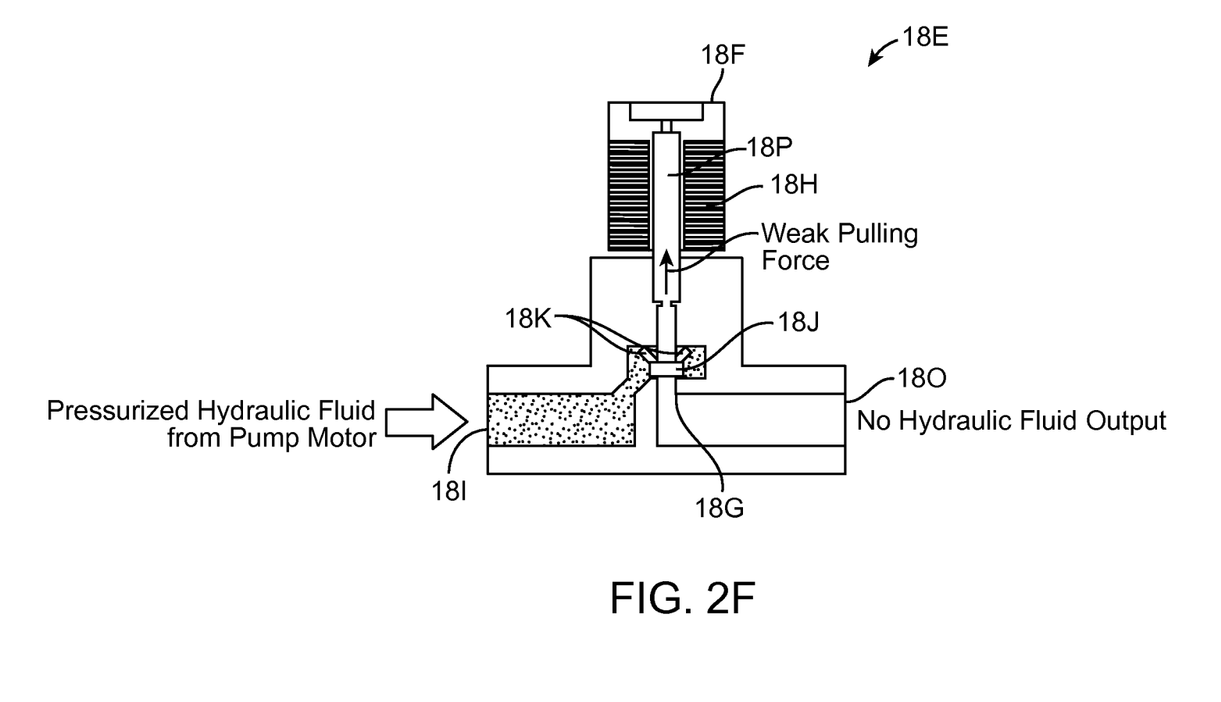
FIG. 2F illustrates a schematic of an energized hydraulic solenoid valve with voltage drop.

FIG. 2F illustrates a schematic of an energized hydraulic solenoid valve 18E (without application of the controller 11) experiencing voltage drop through the coil 18H of the solenoid 18F. Generally, such voltage drop on hydraulic solenoid valve coil 18H, simultaneously with the opposing hydraulic pressure 18K to a corresponding valve plunger 18J, weakens pulling force of the hydraulic solenoid valve coil 18H to close or open said valve 18G. This combination of low voltage and pressure on the plunger 18J will not allow hydraulic actuators 18C to pressurize properly for lifting of the lift gate platform.

The cause of such voltage drop is that when the pump motor coil 17A is energized it requires high inrush current for start up. With battery supplied voltage (no additional power support such as engine alternator), the battery voltage is proportionally affected by unpredictable factors such as current draw and voltage drop due to electrical cable length, etc.

Voltage drop through the coil 18H of the solenoid 18F causes low magnetic field and weak pulling force on the core 18P to pull up the plunger 18J and open the valve 18G. There is pressurized hydraulic fluid from the pump motor, which causes pressure build up on the plunger 18J (as indicated by arrows 18K). The weak pulling force of the energized solenoid coil 18H on the core 18P and plunger 18J cannot properly overcome said hydraulic fluid pressure to open the valve 18G. As such, hydraulic fluid cannot flow between the inlet valve 18I and the outlet valve 18O.

In one embodiment of the invention, according to the controller 11 the ON time delay circuit 14 provides priority power from the toggle switch 15A to the hydraulic solenoid valves 18E to countermeasure an unregulated power source (batteries) to the hydraulic solenoid valve 18E.

The time delay circuit 14 delays (maintains) the ON time delay of the starter solenoid coil 16B for a time period (e.g., by about 160 mS). The delay circuit 14 allows the hydraulic solenoid valve coil 18H to be energized first and become fully engaged in position, while the pump motor coil 17A is being energized via starter solenoid contacts 16A to pump hydraulic fluid into the hydraulic solenoid valve 18E.

Figure 2G:
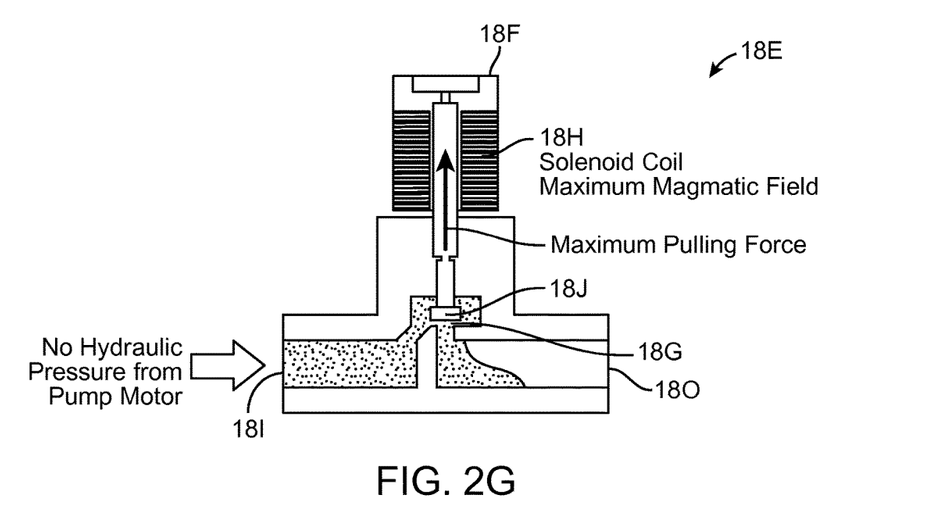
FIG. 2G illustrates a schematic of an energized hydraulic solenoid valve, according to an embodiment of the invention.

Specifically, the ON time delay circuit 14 allows electrical power from toggle switch 15A to energize hydraulic solenoid valve coil 18H first (providing maximum pulling force on plunger 18J) and become fully engaged in position (lifting the plunger 18J and opening the valve 18G) as shown in FIG. 2G. This is while the pump motor coil 17A is being energized via starter solenoid contacts 16A to pump hydraulic fluid into the hydraulic solenoid valve 18E.

When the pump motor coil 17A is energized, a voltage drop at the hydraulic solenoid valves coils 18H will not affect (or minimally effect) the operation of the hydraulic solenoid valve coil 18H. This is because the hydraulic valve plunger 18J is engaged to the open or closed position and awaits the hydraulic pressure to maintain hydraulic valve plunger position.

Figure 2H:
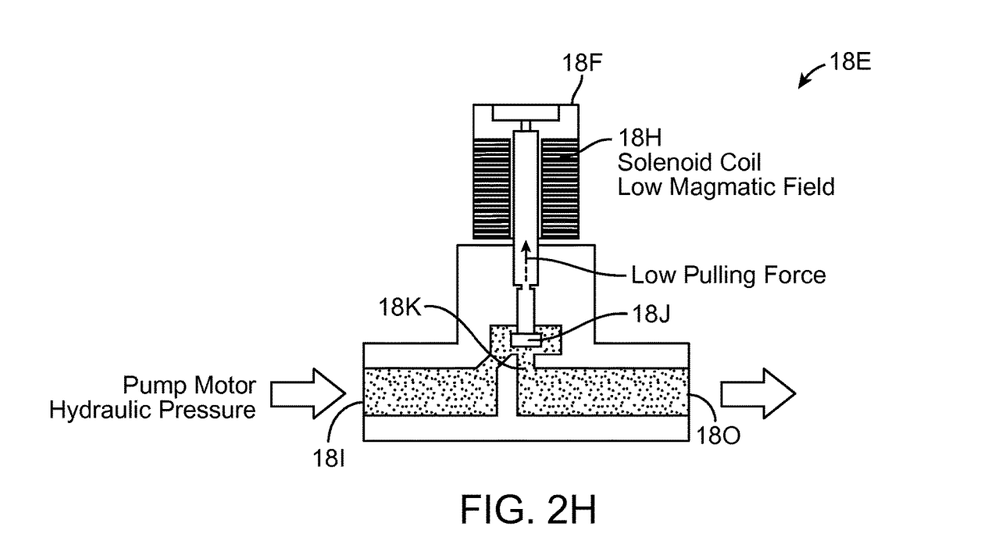
FIG. 2H illustrates a schematic of an energized hydraulic solenoid valve energized with solenoid valve priority power, according to an embodiment of the invention.

As such, when the motor coil 17A is energized, effect of a voltage drop on the hydraulic solenoid valve coil 18H has minimal effect (if any) on operation of the hydraulic solenoid valve coil 18H, due to the applied hydraulic pressure on a valve plunger 18J. As shown in FIG. 2H, even with low magnetic field of the solenoid coil 18H with low pulling force on the plunger 18J, the plunger 18J maintains the valve open and allows flow of hydraulic fluid between the inlet valve 18I and the outlet valve 18O.

In one embodiment of the invention as shown in FIG. 2, the time delay circuit 14 comprises a diode D1, a resistor R1, and capacitor C3, interconnected as shown. The elements R1 and C3 provide Resistance Capacitance (RC) Time Constant (TC) for ON time delay circuit. When the toggle switched 15A is ON, capacitor C3 will gradually charge up through the resistor R1 until the voltage across it reaches the above a Zener diode D1 reverse voltage set point value. R1 value can control C3 charge time.

In one embodiment the controller 11 further includes operation indicators comprising three Light Emitting Diodes (LEDs) such as a power switched indicator LED 19A, a solenoid power indicator LED 19B, and a power indicator LED 19C, as shown in FIG. 2.

When the power switched indicator LED 19A is ON, it indicates that power is ON from the lift toggle switch 15A to energize hydraulic solenoid valve coils 18E and ON time delay to pump motor starter solenoid 16. The LED 19A turns OFF when the lift toggle switch 15A is in the OFF position.

When the solenoid power indicator LED 19B is ON, it indicates that the delayed power is ON to energize solenoid coil 16B for switching the pump motor 17. The LED 19B turns OFF when the lift switch is in the OFF position.

When the power indicator LED 19C is ON, it indicates that the circuit 10 is powered and ready. If the LED 19C is OFF, it indicates a problem such as a short circuit, overload circuit, or no power.

According to embodiments of the invention, the power assist of the controller 11 can be used in combination with one or more of: DC standby battery, DC regulated power supply, DC power booster, and DC stand alone power supply.

Figure 5:
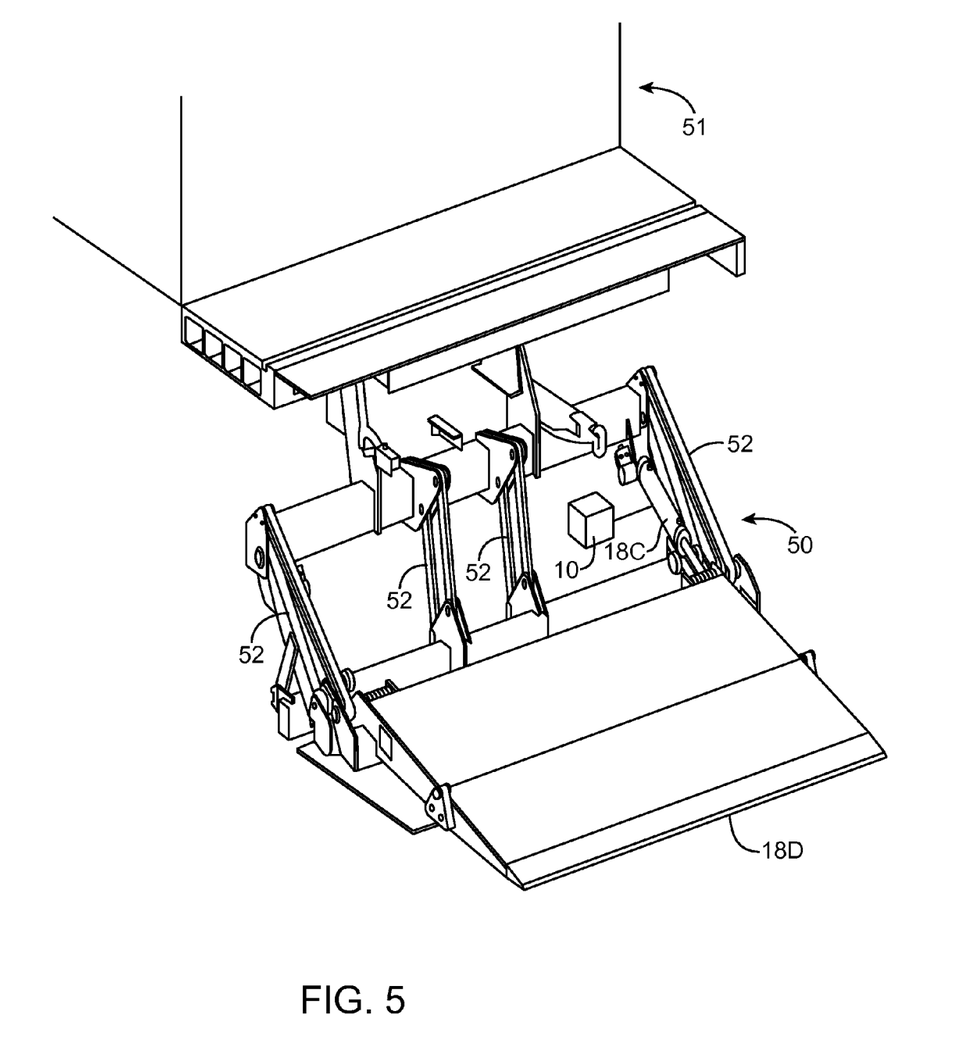
FIG. 5 shows a diagram of an example lift gate for a vehicle, including an electrical pump motor circuit, according to an embodiment of the invention.

FIG. 5 shows a diagram of an example lift gate 50 for a vehicle 51, including a an electrical pump motor circuit (such as the circuit 10 of FIG. 1) for controlling operating of the lift gate 50, according to an embodiment of the invention. The lift gate 50 is shown attached to an opening of the rear of the vehicle 51 (e.g., truck), to lift payloads on the platform 18D from one level (e.g., ground level) up to another level (e.g., the bed of the vehicle), or vice versa.

The example lift gate 50 employs a lifting mechanism including one or more actuators such actuator 18C that actuate parallelogram linkages 52. The parallelogram linkages 52 maintain the lift platform 18 in a horizontal plane through a lifting range. Actuators 53, such as hydraulic actuators (or in another embodiment, electric actuators, are used to provide lifting force for moving the lift platform 18D via the linkages 52).

Embodiments of the invention are useful in various solenoid switch circuits in different applications. Solenoid switches are used to switch high power circuits on and off using a much smaller electrical control signal to actuate the switching. A solenoid valve is an electromechanically operated valve. The valve is controlled by an electric current through a solenoid. A solenoid valve has two main parts: the solenoid and the valve. The solenoid converts electrical energy into mechanical energy which, in turn, opens or closes the valve mechanically.

As noted, solenoids are wound wire magnetic coils with an open core to receive a sliding cylindrical plunger. When the coil is energized with an electrical current, a magnetic field is created in the hollow opening which pulls the plunger into it or pushes it out, based on the orientation of the solenoid and the poles of the plunger. The plunger is mechanically connected to a set of switch contacts, which perform the high power switching. In one example there are four connector terminals on a solenoid switch. The coil requires two and is most often isolated from all the other terminals, which keeps the coil wires completely independent of the current being switched. The switched current terminals are usually substantially heavier than the coil terminals.

Solenoid valves may use metal seals or rubber seals, and may also have electrical interfaces to allow for easy control. A spring may be used to hold the valve opened (normally open) or closed (normally closed) while the valve is not activated.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A solenoid operated circuit, comprising:
   a solenoid switch having a solenoid coil for moving one or more electrical contacts from a first position to a second position to switch an electrical motor ON/OFF; and a solenoid controller comprising an arc suppression circuit that mitigates a reverse self-induced voltage from the electrical motor, thereby suppressing electrical arcing on solenoid switch contacts;

the solenoid controller further comprising a power assist circuit that regulates electrical power to the solenoid coil, wherein in one operational mode the power assist circuit provides electrical power to the solenoid coil from a first power source, and in another operational mode the power assist circuit provides electrical power to the solenoid coil from a second power source to maintain the voltage across the solenoid coil above a dropout voltage;

wherein the arc suppression circuit comprises a filter circuit that absorbs the electrical energy due to said reversed self-induced voltage from the electrical motor, and wherein the filter circuit of the suppression circuit comprises a capacitor connected in parallel between the solenoid switch terminals and in series to the electrical motor; and wherein the capacitor functions as a filter circuit at the instant of voltage reversal in the solenoid switch contacts, such that the capacitor absorbs the electrical energy due to said reversed self-induced voltage of a motor coil of the electrical motor and transfers that energy back to the motor coil and a connected battery, thereby suppressing electrical arcing between solenoid switch contacts and the terminals.

2. The solenoid operated circuit of claim 1, wherein:
the power assist circuit regulates electrical power to the solenoid coil to maintain the voltage across the solenoid coil above the dropout voltage of the solenoid coil, in response to voltage drop in the solenoid coil.

3. The solenoid operated circuit of claim 2, wherein:
in a first operational mode of the power assist circuit, a first electrical path through the power assist circuit supplies electrical power to the power assist circuit from the connected battery for storing electrical charge by the power assist circuit.

4. The solenoid operated circuit of claim 3, wherein:
in a second operational mode of the power assist circuit, a second electrical path through the power assist circuit supplies electrical power from the connected battery to the solenoid coil to energize the solenoid coil and maintain the voltage of the solenoid coil above said dropout voltage.

5. The solenoid operated circuit of claim 4, wherein:
in a third operational mode of the power assist circuit, a third electrical path through the power assist circuit supplies electrical power from a charge storage in the power assist circuit to the solenoid switch to energize the solenoid coil and maintain the voltage solenoid coil above said dropout voltage.

6. The solenoid operated circuit of claim 1, wherein:
the solenoid controller further comprises a time delay circuit that maintains an ON delay state of the solenoid coil for a time period to allow electrical power to energize a hydraulic solenoid valve coil while a coil of the electrical motor is being energized via the solenoid contacts, thereby reducing effect of voltage drop on the operation of the hydraulic solenoid valve coil.

7. The solenoid operated circuit of claim 6, wherein when the motor coil is energized, effect of a voltage drop on the hydraulic solenoid valve coil has minimal effect on operation of the hydraulic solenoid valve coil due to the applied hydraulic pressure on a valve plunger.

8. A solenoid controller, comprising:
a time delay circuit that maintains an ON delay state of a solenoid coil for a time period;

a power assist circuit that regulates electrical power to the solenoid coil, wherein in one operational mode the power assist circuit provides electrical power to the solenoid coil from a first power source, and in another operational mode the power assist circuit provides electrical power to the solenoid coil from a second power source to maintain the voltage across the solenoid coil above a dropout voltage;

an arc suppression circuit for a solenoid switch including the solenoid coil for moving one or more electrical contacts from a first position to a second position to switch an electrical motor ON/OFF, wherein the arc suppression circuit mitigates a reverse self-induced voltage from the electrical motor, thereby suppressing electrical arcing on solenoid switch contacts, wherein the arc suppression circuit comprises a filter circuit that absorbs the electrical energy due to said reversed self-induced voltage from the electrical motor; and the filter circuit of the arc suppression circuit comprises a capacitor connected in parallel between the solenoid switch terminals and in series to the electrical motor;

wherein the capacitor functions as a filter circuit at the instant of voltage reversal in the solenoid switch contacts, such that the capacitor absorbs the electrical energy due to said reversed self-induced voltage of a motor coil of the electrical motor and transfers that energy back to the motor coil and a connected battery, thereby suppressing electrical arcing between solenoid switch contacts and the terminals.

9. The solenoid controller of claim 8, wherein:
the power assist circuit regulates electrical power to the solenoid coil to maintain the voltage across the solenoid coil above the dropout voltage of the solenoid coil, in response to voltage drop in the solenoid coil.

10. The solenoid controller of claim 9, wherein:
in a first operational mode of the power assist circuit, a first electrical path through the power assist circuit supplies electrical power to the power assist circuit from the connected battery for storing electrical charge by the power assist circuit.

11. The solenoid controller of claim 10, wherein:
in a second operational mode of the power assist circuit, a second electrical path through the power assist circuit supplies electrical power from the connected battery to the solenoid coil to energize the solenoid coil and maintain the voltage of the solenoid coil above said dropout voltage.

12. The solenoid controller of claim 11, wherein:
in a third operational mode of the power assist circuit, a third electrical path through the power assist circuit supplies electrical power from a charge storage in the power assist circuit to the solenoid switch to energize the solenoid coil and maintain the voltage solenoid coil above said dropout voltage.

13. The solenoid controller of claim 8, wherein:
the time delay circuit maintains an ON delay state of the solenoid coil for the time period to allow electrical power to energize a hydraulic solenoid valve coil while a coil of the electrical motor is being energized via the solenoid contacts, thereby reducing effect of voltage drop on the operation of the hydraulic solenoid valve coil.

14. The solenoid controller of claim 13, wherein when the motor coil is energized, effect of a voltage drop on the hydraulic solenoid valve coil has minimal effect on operation of the hydraulic solenoid valve coil due to the applied hydraulic pressure on a valve plunger.

15. A lift gate, comprising:
a lift gate actuator for moving a lift gate platform;
a solenoid switch having a solenoid coil for moving one or more electrical contacts from a first position to a second position to switch the electrical motor ON/OFF for operating the lift gate actuator;
a solenoid controller comprising an arc suppression circuit that mitigates a reverse self-induced voltage from the electrical motor, thereby suppressing electrical arcing on solenoid switch contacts;
the solenoid controller further comprises a time delay circuit that maintains an ON delay state of the solenoid coil for a time period, wherein the solenoid controller further comprises a power assist circuit that regulates electrical power to the solenoid coil, wherein in one operational mode the power assist circuit provides electrical power to the solenoid coil from a first power source, and in another operational mode, in response to voltage drop in the solenoid coil, the power assist circuit provides electrical power to the solenoid coil from a second power source to maintain the voltage across the solenoid coil above a dropout voltage;
the arc suppression circuit comprises a filter circuit that absorbs the electrical energy due to said reversed self-induced voltage from the electrical motor; and
the filter circuit of the suppression circuit comprises a capacitor connected in parallel between the solenoid switch terminals and in series to the electrical motor;
wherein the capacitor functions as a filter circuit at the instant of voltage reversal in the solenoid switch contacts, such that the capacitor absorbs the electrical energy due to said reversed self-induced voltage of a motor coil of the electrical motor and transfers that energy back to the motor coil and a connected battery, thereby suppressing electrical arcing between solenoid switch contacts and the terminals.

16. The lift gate of claim 15, wherein:
the power assist circuit regulates electrical power to the solenoid coil to maintain the voltage across the solenoid coil above the dropout voltage of the solenoid coil for proper operation of the solenoid coil in lift gate actuator operation.

17. The lift gate of claim 16, wherein:
in a first operational mode of the power assist circuit, a first electrical path through the power assist circuit supplies electrical power to the power assist circuit from the connected battery for storing electrical charge by the power assist circuit.

18. The lift gate of claim 17, wherein:
in a second operational mode of the power assist circuit, a second electrical path through the power assist circuit supplies electrical power from the connected battery to the solenoid coil to energize the solenoid coil and maintain the voltage of the solenoid coil above said dropout voltage.

19. The lift gate of claim 18, wherein:
in a third operational mode of the power assist circuit, a third electrical path through the power assist circuit supplies electrical power from a charge storage in the power assist circuit to the solenoid switch to energize the solenoid coil and maintain the voltage solenoid coil above said dropout voltage.

20. The lift gate of claim 15, wherein:
the time delay circuit maintains an ON delay state of the solenoid coil for the time period to allow electrical power to energize a hydraulic solenoid valve coil while a motor coil of the electrical motor is being energized via the starter solenoid contacts, thereby reducing effect of voltage drop on the operation of the hydraulic solenoid valve coil.

21. The lift gate of claim 20, wherein when the motor coil is energized, effect of a voltage drop on the hydraulic solenoid valve coil has minimal effect on operation of the hydraulic solenoid valve coil due to the applied hydraulic pressure on a valve plunger.

* * * * *